(12) United States Patent
Deptolla

(10) Patent No.: US 6,502,901 B2
(45) Date of Patent: Jan. 7, 2003

(54) CAR SEAT WITH AN INTEGRATED CHILD SEAT

(75) Inventor: Bernd Deptolla, Niedernwöhren (DE)

(73) Assignee: Faurecia Autositze GmbH & Co. KG, Stadthagen (DE)

( * ) Notice: Subject to any disclaimer, the term of this patent is extended or adjusted under 35 U.S.C. 154(b) by 0 days.

(21) Appl. No.: 09/764,125

(22) Filed: Jan. 19, 2001

(65) Prior Publication Data

US 2001/0009335 A1 Jul. 26, 2001

(30) Foreign Application Priority Data

Jan. 21, 2000 (DE) .......................................... 100 02 465

(51) Int. Cl.⁷ .............................................. A47C 15/00
(52) U.S. Cl. ...................................... 297/238; 297/255
(58) Field of Search ................................. 297/118, 254, 297/255, 256, 328, 233, 237, 244, 378.1

(56) References Cited

U.S. PATENT DOCUMENTS

| | | | |
|---|---|---|---|
| 4,248,476 A | * 2/1981 | Phelps | 297/118 |
| 4,555,135 A | * 11/1985 | Freeland | 297/105 |
| 4,655,503 A | 4/1987 | Kamijo et al. | |
| 5,568,959 A | * 10/1996 | Weber et al. | 297/238 |
| 5,971,479 A | * 10/1999 | Jacquemot et al. | 297/256.14 |
| 6,045,190 A | * 4/2000 | Ward et al. | 297/378.1 |

FOREIGN PATENT DOCUMENTS

| | | |
|---|---|---|
| DE | 34 45 353 | 6/1985 |
| DE | 298 23 483.1 | 6/1999 |
| FR | 2743535 | * 1/1996 |
| FR | 2 743 535 | 7/1997 |

* cited by examiner

Primary Examiner—Anthony D. Barfield
Assistant Examiner—Stephanie Harris
(74) Attorney, Agent, or Firm—Connolly Bove Lodge & Hutz LLP

(57) ABSTRACT

A car seat is provided with a seat part and a backrest and equipped with a headrest region, wherein the backside of the back support is formed a backrest surface of a child seat. The backrest surface can be moved in the travel direction to be used as a child seat from the usage position for adults and the back support is attached to the seat part with an inclination-adjusting fixture, enabling adjustment of the inclination around a lower horizontal axis. The backrest is provided with a lower backrest region attached to the inclination-adjusting fixture, as well as with an upper backrest region, which can be rotated around an upper horizontal axis by means of a fixable hinge fixture hinged on the lower region of the backrest. The lower backrest region can be adjusted with an inclination-adjusting fixture forward into at least an almost horizontal position and the upper backrest region can be adjusted with a hinge fixture into a position inclined in the travel direction.

7 Claims, 2 Drawing Sheets

CAR SEAT WITH AN INTEGRATED CHILD SEAT

FIELD OF THE INVENTION

The invention relates to a car seat having a seat part and a backrest. A backrest surface of a child seat is formed on the backside of the backrest and the backrest surface can be moved in the travel direction to use it as a child seat, rather than the position in which it is used for adults.

BACKGROUND OF THE INVENTION

According to a car seat known from prior art (DE 34 45 353 C2), a child seat is provided wherein the use can be changed so that the seat is converted into a backrest of a child seat by means of connecting rods, enabling relocation from the rear edge of the seat part in the direction toward the front edge of the seat. A backrest surface for children is constructed on the rear side of the backrest of the seat so that it is accommodated in a forward-shifted position, tilted in the driving direction. Only the rear area of the sitting surface of this known car seat will then serve as a seat surface of a child seat when it is utilized for this purpose. At the same time, the rear edge of the seat surface serves in the normal position of the front edge of the seating surface as the front edge of the seat surface in the child seat position. On the seat surface can be alternatively also deployed a removable head support which is designed as a part of the child seat. This known construction requires an expensive attachment of an inclination adjusting partition to the seat part and the range of the adjustment is limited when the seat is used as a child seat.

Another car seat that is also already known (DE 298 23 483 01) has a backrest supported by the seat part which has a divided construction constructed along the first horizontal axle with an adjustable tilt. Two backrest regions are connected together by means of a rotation-adjusting device along a second axle which runs parallel to the first axis and which can be swiveled. The adjustable axles are used only to match the profile of the backrest with the profile of the back of the car user.

Also known is a car seat (FR 2 743 535 A1) according to which the seat part of the child seat can be folded back over rest region of the adult seat part, which remains unchanged while the child seat is folded up. The backrest of the child seat is constructed as a central part of the adult backrest whose remaining area remains unchanged. In order to build the child seat with a sight of vision in the direction opposite the traveling direction, the central seat area is removed from the adult backrest and secured via a supporting rod, in the situation when it is used for children on the backrest structure of the adult seat. When a similar solution is used, both the area of the adult seat part and also the area of the adult backrest will be participating in the construction of the child seat. A similar solution is therefore relatively expensive.

SUMMARY OF THE INVENTION

The purpose of this invention is to form the backrest of a car seat of a known type according to prior art in such a way so that it can be converted into a complete child seat.

The solution of this task is accomplished in accordance with the characteristics disclosed in patent claim 1.

The inclination of the seat part and of the backrest can be selected for the child seat at will. In addition, the headrest, which can be left on the backrest or which can be adjusted to a higher position, can be also used for protection of the head of the child. The resulting height of the seat surface allows even small children to have a good view. The backrest can be selectively adjusted in a simple manner and with few manual operations either to the normal status or to the child status.

Preferred embodiments of the invention will become clear from the subordinated claims.

The backrest according to the invention has a dual functional arrangement of the construction of a child seat of the upper axle which serves two purposes: in addition to the function enabling conversion to a child seat, it is also possible to match the profile of the backrest in the usual usage position when it is used by a grownup, in order to match it to the profile of the back of the user. The adjustment range of a hinge fixture, which defines the horizontal axis, can be selected with any desired size.

BRIEF DESCRIPTION OF THE DRAWINGS

The following are preferred embodiments of the invention, which is described in detail based on the enclosed figures. These figures indicate.

DETAILED DESCRIPTION OF THE INVENTION

Figure 1:
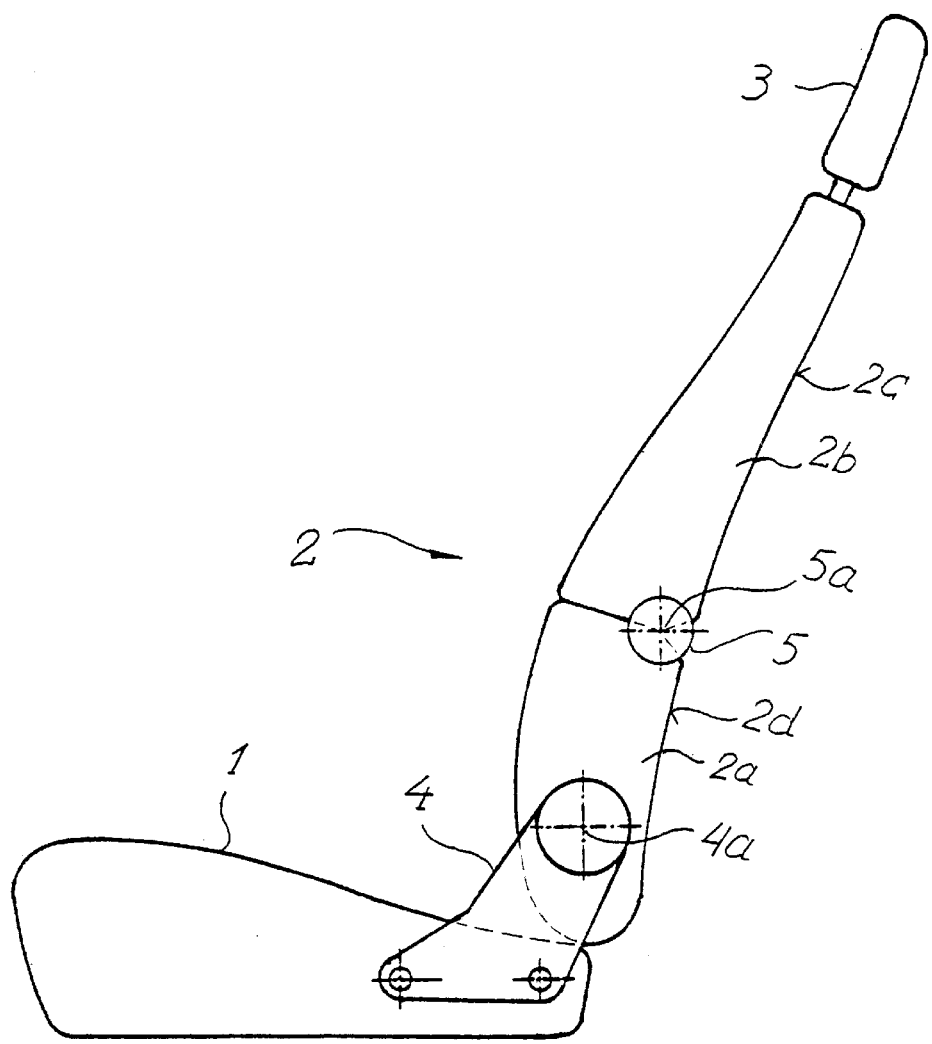
FIG. 1—a profile view of a car seat in the usage position for adults.
Figure 2:
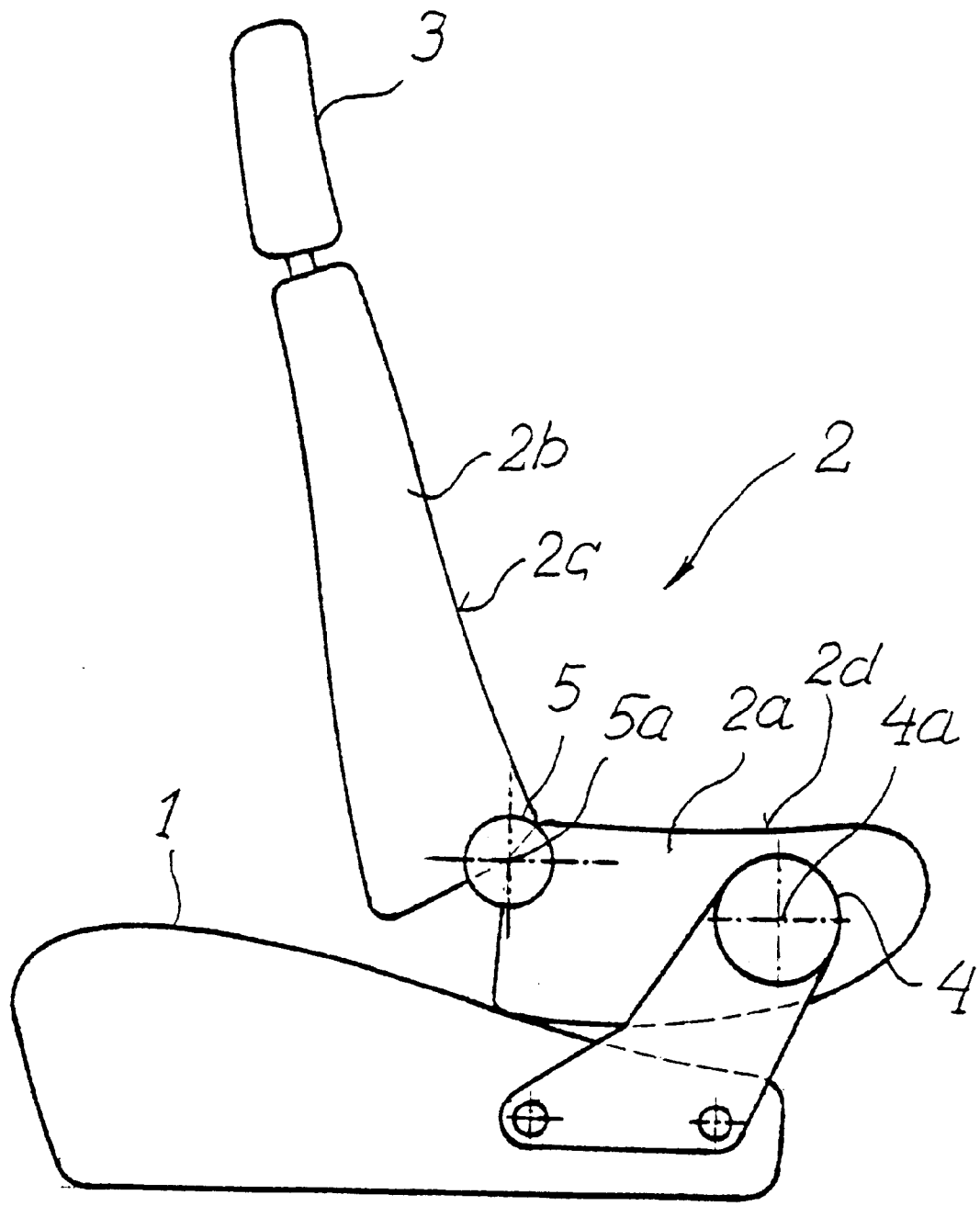
FIG. 2—a profile view of a car seat with a backrest converted into a child seat.

FIG. 1 shows a car seat with a seat part 1 and backrest 2 depicted in the position suitable for use by an adult passenger who is looking in the direction of the travel. The backrest 2 is pivoted on seat part 1 so that it can be tilted. Inclination adjusting fixture 4 is used in order to tilt backrest 2 around a lower horizontal axle 4a. The inclination-adjusting fixture 4 can include for instance a rotation adjustment device or a locking adjustment device.

The backrest 2 is divided into a lower support region 2a and an upper support region 2b. Both support regions 2a and 2b can be swiveled with respect to each other around an upper axle 5a, which runs parallel to the lower axle.

Both regions are connected together with a hinge fixture 5. The hinge fixture 5 also includes, for instance, a rotation adjustment device or a locking adjustment device, which can be used to adjust and fix the upper region 2b with respect to the lower region 2a. A headrest region 3 is formed in the upper part of the backrest region 2b with an adjustable height.

The inclination of backrest 2 can be adjusted to a tilt that is comfortable for the seat user. The headrest 3 is adjustable so that it would correspond to the size of the head of the user. In addition, the curving of backrest 2 can be matched to the profile of the back of the seat user, in particular in the lordosis (hollow back) region.

The backside in the upper backrest region 2b is formed as a backrest surface 2c of a child seat, wherein the child sits with his back in the direction of the travel. The backside of the lower backrest region 2a is formed as child seat surface 2d. In order to convert the car seat into a child seat, the lower backrest region 2a is rotated by means of inclination adjusting fixture 4 in the direction of the travel. The backside of backrest 2a and also the child seat surface 2d will thus be positioned in the horizontal direction. The lower region of the backrest will be fixed in this position. Opposite the lower backrest region 2a, the upper backrest region 2b is locked by hinge fixture 5 and tilted in the counter-clockwise direction so that it is almost in the upright position in a position wherein it is slightly tilted in the travel direction.

The headrest 3, which is connected to the backrest surface 2c, can be adjusted to a position in the height of the head of a child.

The headrest 3, which is provided with padding on one side, is rotated by 180° around an axis, which is symmetrical to the longitudinal direction of backrest 2. Because the headrest 3 is guided by means of two guide bars into the backrest 2, it can be also removed from its counter-supports, turned around again by 180° and then inserted so that it is mounted again on the counter-supports.

What is claimed is:

1. A car seat with a seat part (1) and a backrest (2), equipped with a headrest (3), wherein a backrest surface (2c) of a child seat is formed on the back side of the backrest, while this backrest surface (2c) can be moved in the travel direction in order to use it as a child seat from the usage position in which it is used for adults, and wherein the backrest (2) is equipped with an inclination adjusting fixture (4) and provided with the capability enabling it to adjust its inclination along a lower horizontal axle (4a);

said backrest (2) being equipped with a lower backrest region (2a), which is attached to the seat part (1) with an inclination adjusting fixture (4) and with an upper backrest region (2b), which is rotated by means of a fixable hinge fixture (5) around an upper horizontal axle (5a), and which is hinged directly to a lower backrest region (2a), wherein the lower backrest region (2a) is adjusted so that it is moved with the inclination adjusting fixture (4) into a forward position in which it will be at least almost in the horizontal position, while also the upper backrest region (2b) is adjusted so that it is moved with hinge fixture (5) in a position inclined forward in the travel direction.

2. The car seat according to claim 1, wherein the lower backrest region (2a) is formed as a child seat surface (2d) on its back side.

3. The car seat according to claim 2, wherein headrest region (3) is attached to backrest (2) in a detachable fashion and that it is movable around a vertical rotational axis by 180° with respect to the usage position for use by adults, as well as fixable in a position with a selectable height for use by children.

4. The car seat according to one or several of the claims 1 through 3, wherein the upper axle (5a) is deployed in the lordosis (hollow back) region.

5. The car seat according to one or several of the claims 1 through 4, wherein an inclination adjusting fixture (4) and/or hinge fixture (5) is/are constructed as locking adjustment device(s).

6. The car seat according to claim 5, wherein the locking adjustment device is constructed as a circular adjustment device.

7. The car seat according to one or several of the claims 1 through 4, wherein the inclination adjusting fixture (4) and/or hinge fixture (5) is/are constructed as rotation adjustment device(s).

* * * * *